United States Patent [19]
Buttery et al.

[11] Patent Number: 5,286,381
[45] Date of Patent: Feb. 15, 1994

[54] FILTER ASSEMBLIES

[75] Inventors: Roger A. Buttery, Petersfield; Charles N. Rothwell, Halifax, both of England

[73] Assignee: Pall Corporation, Glen Cove, N.Y.

[21] Appl. No.: 697,775

[22] Filed: May 9, 1991

[30] Foreign Application Priority Data

May 9, 1990 [GB] United Kingdom ............... 9010349

[51] Int. Cl.⁵ ............................................. B01D 29/39
[52] U.S. Cl. .................. 210/323.2; 210/340; 210/341; 210/346; 210/486
[58] Field of Search ................. 210/323.2, 340, 341, 210/346, 455, 486; 55/350

[56] References Cited

U.S. PATENT DOCUMENTS

| | | | |
|---|---|---|---|
| 4,836,925 | 6/1989 | Wolf | 210/323.2 |
| 5,008,008 | 4/1991 | Lackshaw | 210/323.2 |
| 5,028,323 | 7/1991 | Gould | 210/323.2 |

FOREIGN PATENT DOCUMENTS

| | | |
|---|---|---|
| 729356 | 1/1953 | United Kingdom . |
| 778524 | 1/1956 | United Kingdom . |
| 2080697 | 7/1980 | United Kingdom . |

*Primary Examiner*—Robert A. Dawson
*Assistant Examiner*—W. L. Walker
*Attorney, Agent, or Firm*—Leydig, Voit & Mayer

[57] ABSTRACT

A filter assembly particularly useful for the nuclear industry is provided with a number of cylindrical cartridge filters attached to a plenum chamber which is formed by a rotational moulding process. A rod is provided on the assembly which can be attached to an automatic handling device to allow remote fitting and removal of the filter assembly into and from a casing. The assembly is easy and cheap to manufacture and can be destroyed after use.

20 Claims, 3 Drawing Sheets

FILTER ASSEMBLIES

BACKGROUND TO THE INVENTION

1. Field of the Invention

The present invention relates to filter assemblies.

One form of commonly used filter assembly comprises a plurality of elongate filter cartridges with each cartridge having an outlet end mounted on a plenum chamber, with the outlets communicating with the interior of the plenum chamber. In use, the whole assembly is inserted into a casing with the plenum chamber closing an open end of the casing. Liquid to be filtered is pumped into the casing, passes through the cartridges, through the outlets to the cartridges, into the plenum chamber and then exits the plenum chamber for onward processing.

2. Brief Review of the Prior Art

It has previously been customary to form the plenum chamber in two parts by an injection moulding process. Such a process is particularly suitable where a very substantial number of plenum chambers have to be produced, but is less cost effective when the number of plenum chambers to be produced is small.

The use of plenum chambers formed in two parts by injection moulding also has the disadvantage that a join must be made between the two parts and this introduces an extra manufacturing process. If the join is not sufficiently tight, leakage may occur.

SUMMARY OF THE INVENTION

Accordingly, the present invention provides several elongate filter cartridges and a one-piece hollow plastics plenum chamber formed by a rotational moulding process wherein the plenum chamber is without joins. Each filter cartridge has an outlet at one end, and there are two or more apertures on a surface of the plenum chamber. Each aperture in the plenum chamber surface communicates with an outlet of a filter cartridge.

By forming the plenum chamber by a rotational moulding process, the required tooling can be produced much less expensively than that for a die casting process and, in addition, the chamber is produced in one piece which obviates the requirement for a subsequent manufacturing step.

The following is a more detailed description of one embodiment of the invention, by way of example, reference being made to the accompanying drawings.

DESCRIPTION OF THE PREFERRED EMBODIMENTS

Figure 1:
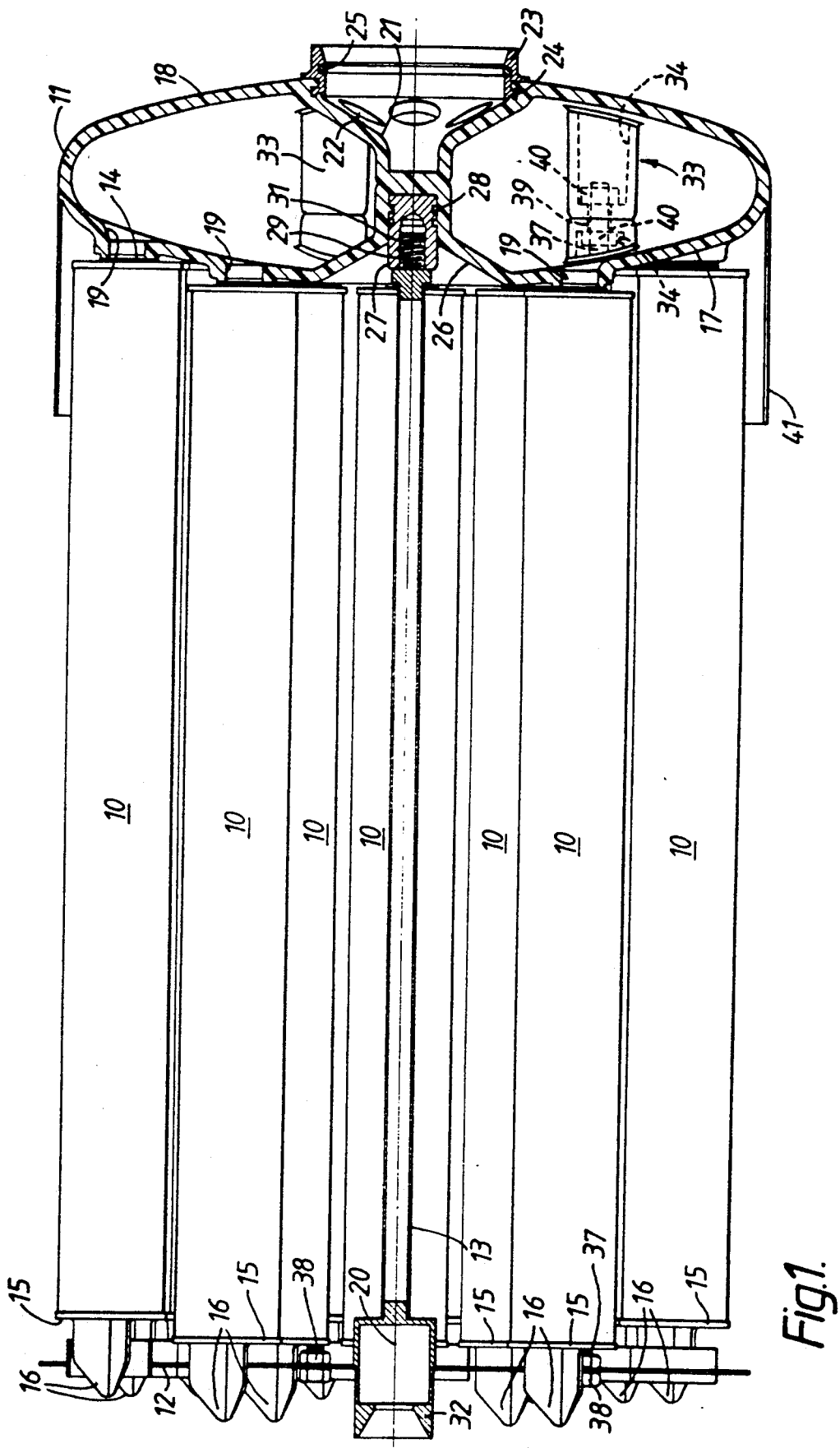
FIG. 1 is a side elevation, partly in cross-section, of a filter assembly formed by a plenum chamber and filter cartridges and taken on the lines Z—Z of FIGS. 2 and 3.

Referring first to FIG. 1, the filter assembly comprises a plurality of elongate filter cartridges 10, a plenum chamber 11 at one end of the cartridges 10 and a retaining plate 12 at the opposite end of the cartridges 10. A rod 13 for attachment to a lifting device extends through the assembly.

Figure 3:
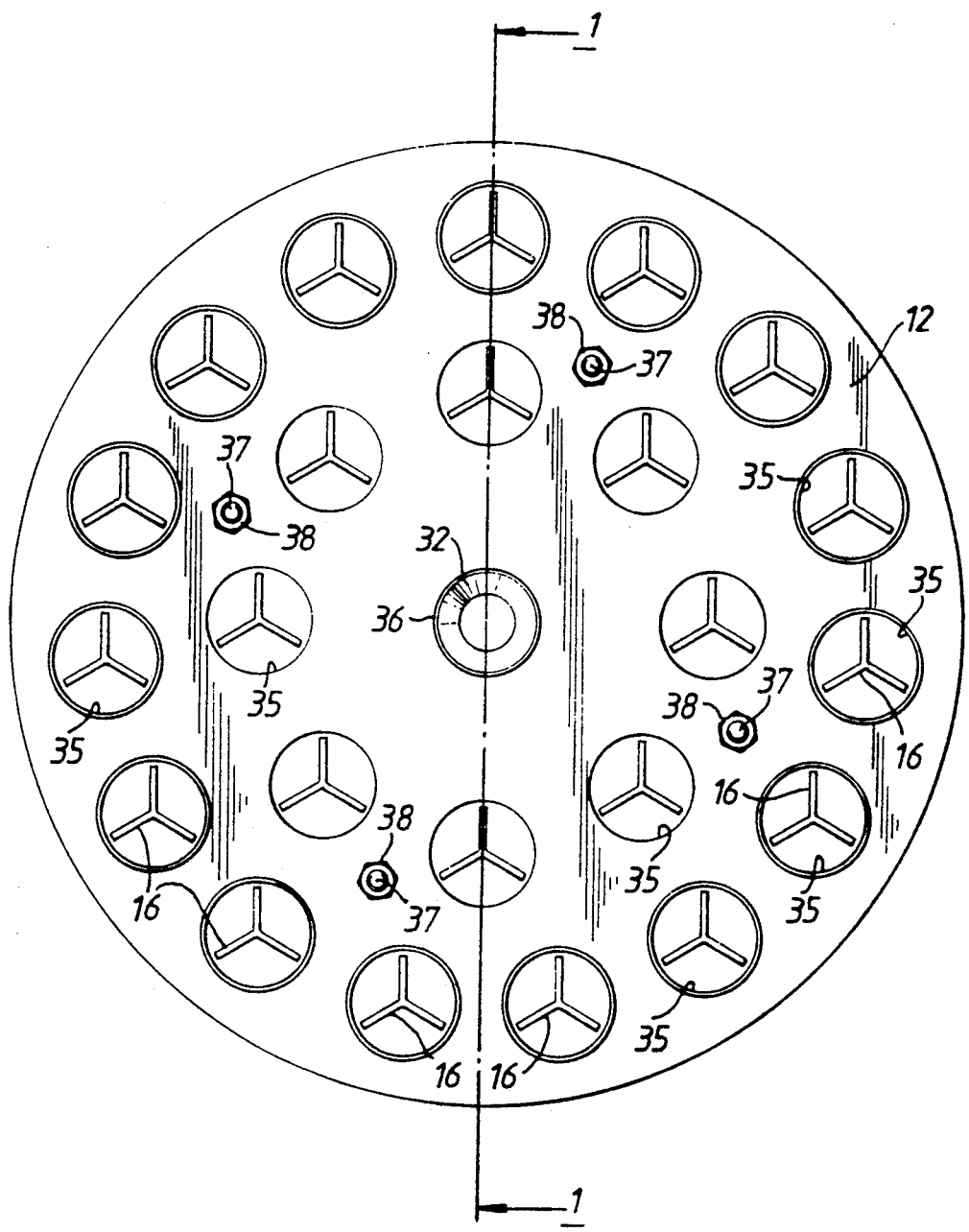
FIG. 3 is a plan view of a retaining plate and the ends of the filter cartridges of the filter assembly of FIGS. 1 and 2.

Each cartridge 10 has an outlet 14 at one end and is closed by an end cap 15 at the opposite end. Three equi-angularly spaced fins 16 project from each end cap, as best seen in FIGS. 1 and 3. The remaining construction of each filter cartridge 10 is conventional and will therefore not be described in detail.

As best seen in FIG. 3, there may be 23 cartridges, but more or less cartridges may be provided as required.

The plenum chamber 11 is circular in plan (see FIG. 2) with a generally flat oval cross-section (see FIG. 1). The plenum chamber 11 is formed by a rotational moulding process in which a particulate polymer is inserted into a suitably shaped rotatable mould which is then rotated and heated to form the plenum chamber 11. On completion, the mould is split after cooling and the chamber removed.

The plenum chamber 11 has a curved inner surface 17 and a curved outer surface 18. The inner surface 17 is provided during the moulding process with a plurality of apertures 19 equal to the number of cartridges 10 and shaped to allow attachment of the outlets 14 of the cartridges 10 to the apertures 19. This attachment may be by any suitable means, but it is preferred that connection is by a hot plate weld to ensure a permanent seal and to eliminate the need for separate seals. As will be seen from FIG. 1, the cartridges are arranged with their axes parallel to the axis 20 of the plenum chamber 11 and are spaced around that axis 20.

Figure 2:
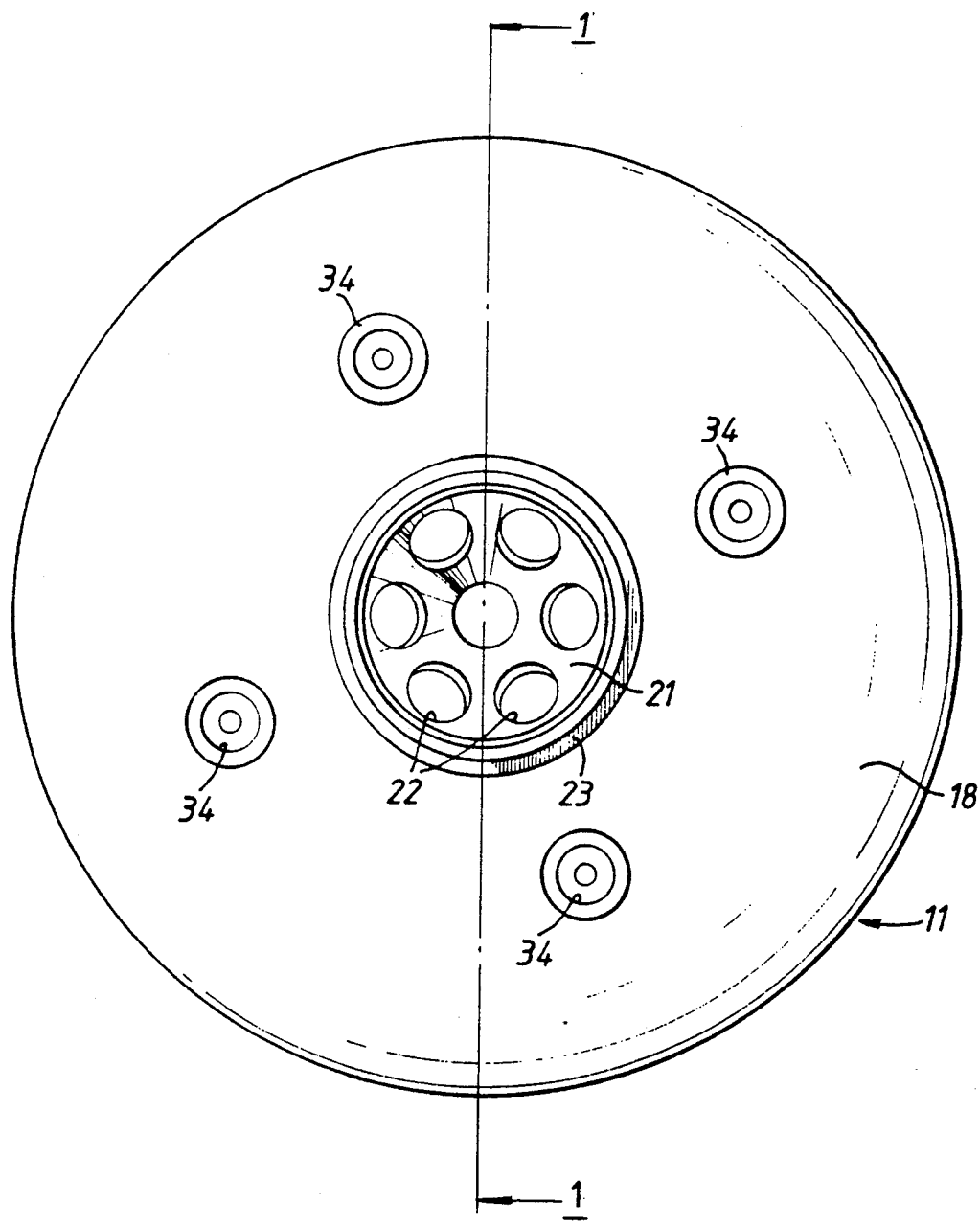
FIG. 2 is a plan view of the plenum chamber of the filter assembly.

The outer surface 18 of the plenum chamber 11 is provided with a central depression 21 formed by the mould as best seen in FIGS. 1 and 2, holes 22 are provided in this depression 21 to form an outlet from the interior of the plenum chamber 11. In addition, an annular metal adapter 23 extends around the depression 21 and is attached to the plenum chamber 11 during casting by the formation of a key between the material of the plenum chamber 11 and a shaped rib 24 of the adapter 23. The purpose of the adapter 23 is to provide a connection to an outlet tube (not shown) and for this purpose it carries an O-ring seal 25.

The inner surface 17 is also provided with a central depression 26, again formed by the mould during the rotational moulding process. A nut 27 is located at the centre of this depression 26 and is attached to the plenum chamber 11 during the rotational casting process by flow of the material of the plenum chamber 11 into annular grooves 28 on the exterior of the nut 27. The thread 29 of the nut 27 is coaxial with the axis 20 of the plenum chamber 11.

The rod 13 has one end 31 in screw-threaded engagement with the nut 27 and has at its opposite end a device 32 making engagement with a handling arrangement (not shown) to allow automatic fitting and removal of the filter assembly. The plenum chamber 11 also has, extending across its interior, a plurality of columns 33. Each column 33 is formed during the rotational moulding process by the provision on the interior of the mould of two projections which extend towards each other, but do not meet. As the moulding process takes place, molten plastics material accumulates around these projections and eventually sufficient plastics material is accumulated to form the continuous column 33. After moulding, the projections are removed, so that the inner and outer surfaces 17,18 of the plenum chamber are formed with respective co-operating tubes 34 extending into the plenum chamber from opposite sides with each tube 34 being closed at its inner end and the ends of the two tubes abutting one another to form the column 33. The axes of the columns 33 are parallel to the axis 20 of the plenum chamber. These columns improve the rigidity of the plenum chamber and help to resist external pressure, and have another function that will be described below.

The retaining plate 12, best seen in FIGS. 1 and 3, is provided with holes 35 to receive the fins 16 at the ends of the cartridges 10. This maintains the spacing of the cartridges 10. The retaining plate 12 has a central hole 36 through which the locking device 32 projects.

The retaining plate 12 is held in position by four tie rods 37, which may be of nylon. The retaining plate 12 is clamped to each tie rod 37 by a pair of nuts 38. At the plenum chamber 11, each tie rod 37 extends into a column 38, with the end passing through a hole 39 in the ends of the two tubes 34 forming the column 33 and is held by two nuts 40 in the tube 34 extending from the outer surface 18, as best seen in FIG. 1. The retaining plate 12 is thus held in a fixed position relative to the plenum chamber 11.

An annular baffle plate 41 (see FIG. 1) is welded around the edge of the plenum chamber 11 and extends over the upper portions of the cartridges 10, for a purpose to be described below.

In use, the filter assembly described above with reference to the drawings is inserted into a casing (not shown) provided with an inlet (not shown), with the inlet being adjacent the baffle plate 41. The casing is sealed to the plenum chamber 11 and a suitable outlet to be attached to the adapter 23. The liquid to be filtered then enters the inlet, passes through the filter cartridges 10, and exits through the filter cartridge outlets 14, the apertures 19 in the plenum chamber, the holes 22 in the depression 21 and the adapter 23. The baffle plate 41 prevents the cartridges 10 being damaged by liquid entering the inlet in the casing.

When the filter cartridges are spent, the casing can be removed by remote control and the lifting device attached to the device 32 lifts the filter assembly out of the casing. Such remote handling is necessary where the filter assembly is used in the nuclear industry. In such a case, the whole assembly may then be destroyed.

In the nuclear industry, the demand for filters is not high. For this reason, other methods of producing the plenum chamber, such as injection moulding, are not economically viable. In addition, injection moulding requires the plenum chamber to be formed in two parts so involving an additional joining operation after the formation of the parts. In a rotational moulding method, differential heating of the mould parts can allow localized thickening of the plenum chamber at those locations where the stresses arising in use are likely to be greatest.

I claim:

1. A filter assembly comprising:
a plurality of elongate filter cartridges;
means defining an outlet at one end of each of said filter cartridges;
a one-piece hollow plastics plenum chamber formed by a rotational moulding process wherein the plenum chamber is without joins; and
means defining a plurality of apertures on a surface of said plenum chamber, each aperture communicating with a respective means defining an outlet at one end of one said filter cartridges.

2. A filter assembly as claimed in claim 1 wherein the plenum chamber is generally circular in plan with a flat oval cross-section to provide curved inner and outer surfaces, the filter cartridges being mounted on said inner surface and means defining an outlet being provided on said outer surface.

3. A filter assembly as claimed in claim 2 wherein the upper surface is provided with a central depression formed with a plurality of holes to provide said means defining an outlet to the plenum chamber.

4. A filter assembly as claimed in claim 1 wherein the means defining an outlet to each cartridge is welded to the associated means defining an aperture of the plenum chamber.

5. A filter assembly as claimed in claim 1 wherein the ends of the cartridges remote from the plenum chamber have closed ends, and wherein a retaining plate is provided which engages said ends to maintain the spacial relationship of the cartridges.

6. A filter assembly comprising:
a plurality of elongate filter cartridges;
means defining an outlet at one end of each of said filter cartridges;
a one-piece hollow plastics plenum chamber formed by a rotational moulding process wherein the plenum chamber includes means defining an outlet and an annular metal adapter ring on the outer surface around said means defining an outlet; and
means defining a plurality of apertures on a surface of said plenum chamber, each aperture communicating with a respective means defining an outlet at one end of said filter cartridges.

7. A filter assembly comprising:
a plurality of elongate filter cartridges;
means defining an outlet at one end of each of said filter cartridges;
a one-piece hollow plastics plenum chamber formed by a rotational moulding process wherein the plenum chamber includes at least one support column extending across the interior of the chamber to improve the resistance of the chamber to compressive forces; and
means defining a plurality of apertures on a surface of said plenum chamber, each aperture communicating with a respective means defining an outlet at one end of said filter cartridges.

8. A filter assembly as claimed in claim 7 wherein at least one column is formed by a pair of tubes formed during the moulding process and extending into the plenum chamber from opposite sides thereof, each tube being closed at the inner ends thereof and the ends of the two tubes abutting one another to form said support column.

9. A filter assembly comprising:
a plurality of elongate filter cartridges;
means defining an outlet at one end of each of said filter cartridges;
a one-piece hollow plastics plenum chamber formed by a rotational moulding process wherein a rod is provided having two ends, one end being attached to the plenum chamber and the other end being located adjacent the ends of the cartridges remote from the plenum chamber, said other end of the rod being provided with means for attachment to a lifting device by which the filter may be lifted; and
means defining a plurality of apertures on a surface of said plenum chamber, each aperture communicating with a respective means defining an outlet at one end of said filter cartridges.

10. A filter assembly as claimed in claim 9 wherein the rod is attached to the plenum chamber by engagement with an insert incorporated in the plenum chamber during the rotational casting thereof.

11. A filter assembly as claimed in claim 10 wherein said insert is provided in a central depression formed in said inner surface of the plenum chamber.

12. A filter assembly comprising:
a plurality of elongate filter cartridges;
means defining an outlet at one end of each of said filter cartridges;
a one-piece hollow plastics plenum chamber formed by a rotational moulding process wherein the end of the cartridges remote from the plenum chamber have closed ends, wherein a retaining plate is provided which engages said ends to maintain the spacial relationship of the cartridges, and wherein said retaining plate is connected to the plenum chamber by at least one tie rod, the tie rod being attached at one end to the retaining plate and an opposite end to the plenum chamber; and
means defining a plurality of apertures on a surface of said plenum chamber, each aperture communicating with a respective means defining an outlet at one end of said filter cartridges.

13. A filter assembly as claimed in claim 12 wherein at least one column is formed by a pair of tubes formed during the moulding process and extending into the plenum chamber from opposite sides thereof, each tube being closed at the inner ends thereof and the ends of the two tubes abutting one another to form said support column, one end of the or each tie rod being received in the tubes forming a column, and is held relative to the column to position the retaining plate.

14. A filter assembly comprising:
a plurality of filter cartridges,
two ends provided on each of said plurality of cartridges
a first of said two ends being closed,
a second of said two ends being provided with means defining an outlet
a rotationally-moulded one-piece hollow plastics plenum chamber without joins and having an oval cross-section
an exterior surface on said plenum chamber and divided into an inner surface portion and an outer surface portion,
means defining a plurality of apertures in said inner portion of the exterior surface, each aperture means being connected to a means defining an outlet of a filter cartridge,
means defining an outlet on said outer portion of said exterior surface.

15. A filter assembly according to claim 14 wherein the upper surface is provided with a central depression formed with a plurality of holes to provide said means defining an outlet to the plenum chamber.

16. A filter assembly according to claim 14 wherein the plenum chamber includes at least one support column extending across the interior of the chamber to improve the resistance of the chamber to compressive forces.

17. A filter assembly according to claim 16 wherein at least one column is formed by a pair of tubes formed during the moulding process and extending into the plenum chamber from opposite sides thereof, each tube being closed at the inner ends thereof and the ends of the two tubes abutting one another to form said support column.

18. A filter assembly according to claim 14 wherein a rod is provided having two ends, one end being attached to the plenum chamber and the other end being located adjacent the ends of the cartridges remote from the plenum chamber, said other end of the rod being provided with means for attachment to a lifting device by which the filter may be lifted.

19. A filter assembly according to claim 18 wherein the rod is attached to the plenum chamber by engagement with an insert incorporated in the plenum chamber during the rotational casting thereof.

20. A filter assembly according to claim 19 wherein said insert is provided in a central depression formed in said inner surface of the plenum chamber.

* * * * *